United States Patent [19]

Cambiaghi et al.

[11] Patent Number: 4,470,194
[45] Date of Patent: Sep. 11, 1984

[54] DEVICE FOR SLIPPING WASHERS AND LIKE ONTO SHANKS OF SCREWS AND THE LIKE

[75] Inventors: Danilo Cambiaghi; Willy Wegner, both of Milan, Italy

[73] Assignee: Omega Officine Meccaniche S.p.A., Desio, Italy

[21] Appl. No.: 417,570

[22] Filed: Sep. 13, 1982

[30] Foreign Application Priority Data

Sep. 14, 1981 [IT] Italy ................. 23953 A/81

[51] Int. Cl.³ ............................................. B23P 19/08
[52] U.S. Cl. ..................... 29/783; 10/155 A; 29/785; 29/786
[58] Field of Search ............... 10/155 R, 155 A, 169; 29/783, 785, 786, 790, 792, 793

[56] References Cited

U.S. PATENT DOCUMENTS

| | | | |
|---|---|---|---|
| 2,711,550 | 6/1955 | Nielsen | 10/155 A |
| 2,914,781 | 12/1959 | Prutton | 10/155 A |
| 3,114,159 | 12/1963 | Yoshikawa | 10/155 A |
| 3,212,114 | 10/1965 | Pipes | 10/155 A |
| 3,226,744 | 1/1966 | Marechal et al. | 10/155 A |
| 3,523,316 | 8/1970 | Alexander | 10/155 A |
| 3,568,229 | 3/1971 | Moore et al. | 10/155 A X |
| 3,622,039 | 11/1971 | Lindstrom | 221/10 |
| 3,948,616 | 4/1976 | Gardner | 29/786 X |
| 4,224,729 | 9/1980 | Tarzian | 29/786 X |
| 4,237,605 | 12/1980 | Jung et al. | 29/783 |
| 4,309,787 | 1/1982 | Lapohn | 10/155 A |

FOREIGN PATENT DOCUMENTS 1577089 1/1970 Fed. Rep. of Germany ... 10/155 A

Primary Examiner—E. Michael Combs
Attorney, Agent, or Firm—Schwartz, Jeffery, Schwaab, Mack, Blumenthal & Koch

[57] ABSTRACT

A device for slipping washers and like objects onto the shanks or stalks of screws and like articles comprises a couple of discs which are rotated integrally together. The top disc has peripheral hollow spaces to which the screws are fed to be conveyed at a certain angle hung by their heads. The bottom disc has vertical dowels arranged on a circumference having a radius equal to that of the circumference containing the axes of the hung screws. To a point of the periphery of the bottom disc washers are fed to enter an upward sloping circular channel. The dowels are passed through a central longitudinal slit of said circular channel in such a way that each screw may push a washer to ascend such channel in order that the washer may be slipped onto the stalk of the respective screw. Preferably, the washers are forcibly driven by a feeding mechanism into said circular channel and a safety system is provided to prevent a screw from being introduced into a hollow space of the top disc if the circular channel has not yet received a washer intended to be slipped onto the screw concerned.

9 Claims, 10 Drawing Figures

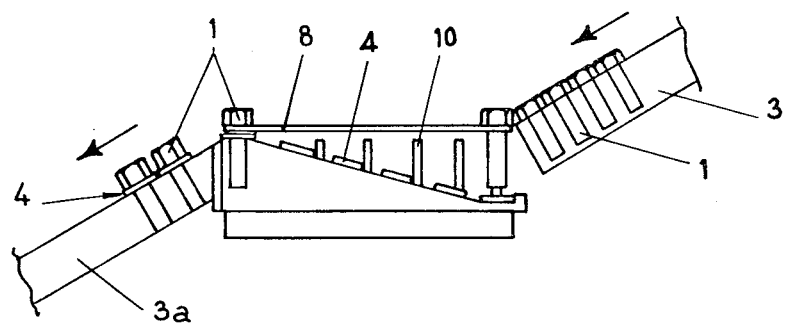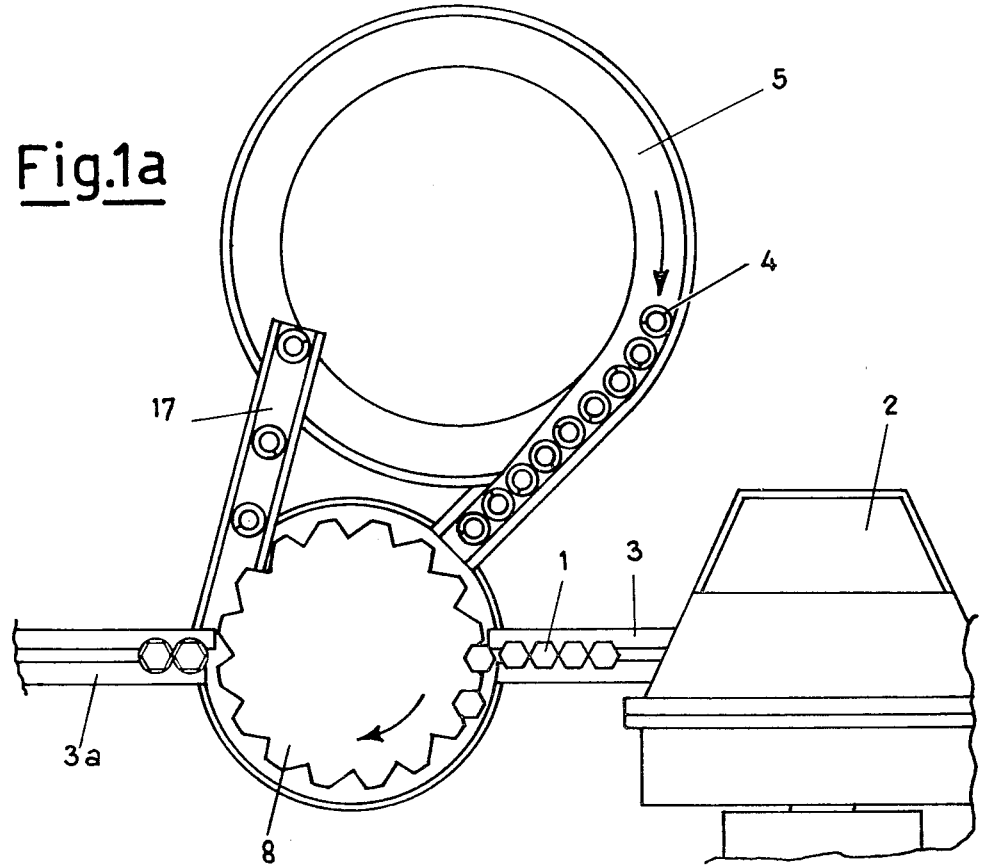

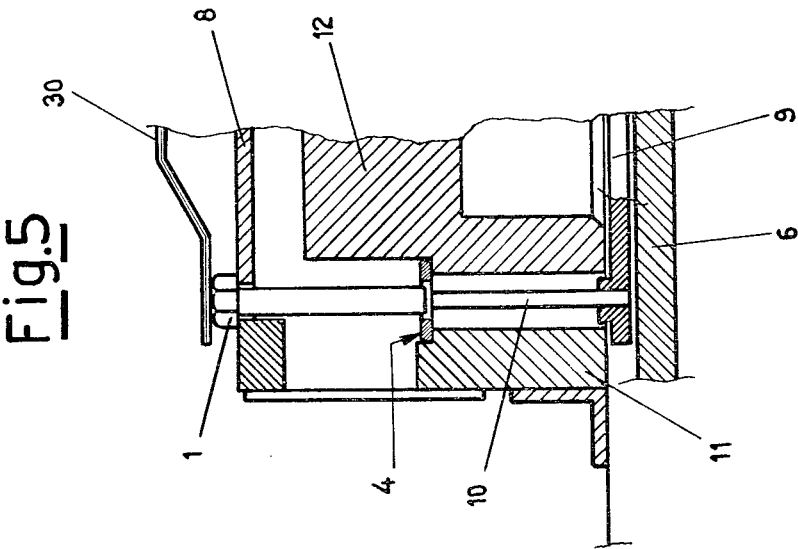
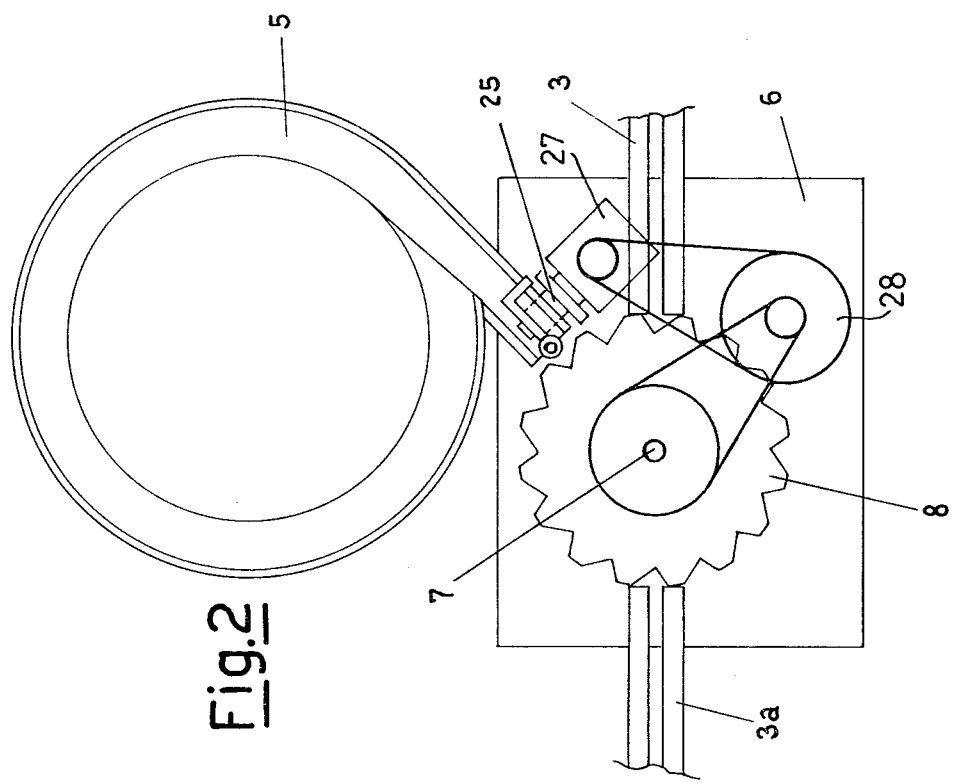

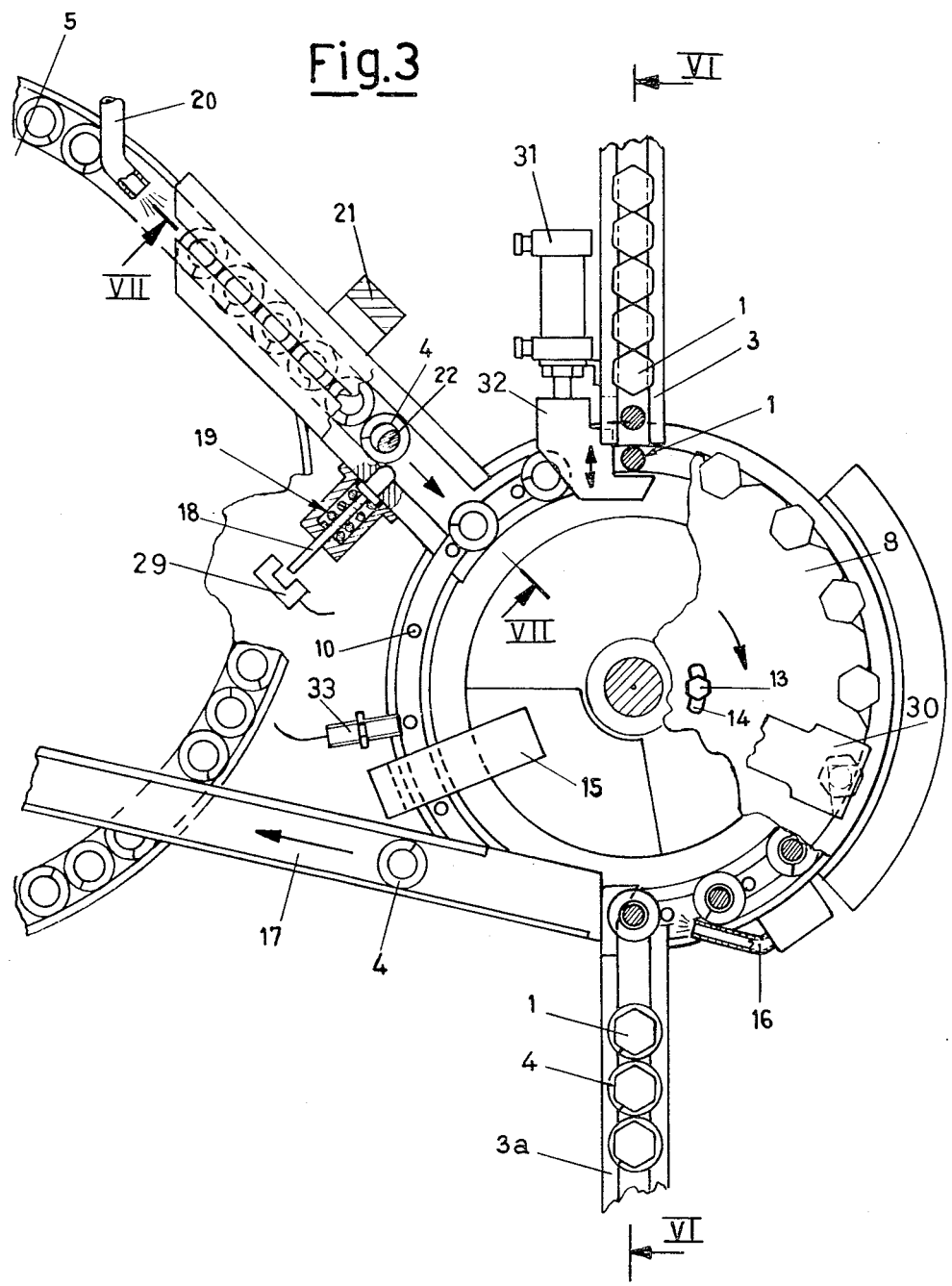

DEVICE FOR SLIPPING WASHERS AND LIKE ONTO SHANKS OF SCREWS AND THE LIKE

This invention relates to a device for slipping washers and like objects onto the shanks or stalks of screws, bolts, nails and like articles.

Screws will be particularly referred to hereinafter without thereby restricting the scope of the invention thereto. A device of the kind referred to above is used, more particularly, on a thread-rolling machine, to slip washer onto the blank prior to rolling, the stalk being thereby enlarged so that it retains the washer slipped thereon.

The German published Patent Application No. 18 10 203 discloses a device of the kind referred to above, wherein the assemblage of the component parts (fed by discrete loading systems) is carried out with the aid of mutually inclined ducts.

Said conventional device has the following defects:
(1) When spring or split washers are in the question, it proves difficult to establish a fixed abutment point between the end of the blank stalk and the hole of the washer;
(2) The feeding duct and the washer feeding mechanism must be level-adjusted so as to match the different blank stalk lengths;
(3) The washer enters the assembling system by the effect of the gravity pull;
(4) Blanks which escaped assembly are driven off the assembling disc by an air jet.

The defects listed under 1, 3 and 4 above make the assembly unreliable, whereas the defect indicated at 2 renders the adjustment inconvenient.

The objective of the present invention is to offset the drawbacks enumerated above and to render the assembling operation more reliable.

In order that this objective may be attained, the present invention provides a device for slipping washers and the like onto the stalks of screws and similar articles, said device comprising an assembling disc having evenly spaced apart peripheral hollow spaces adapted to receive, to support and to convey said screws, means for imparting to said assembling disc a continuous rotary motion about its axis, a sloping-duct feeding system to feed by the effect of the gravity pull the screws into the peripheral hollow spaces of said disc, a circular upward sloping conduit placed beneath the assembling disc for receiving the washers to be slipped onto the screw shanks and having a central longitudinal slit, a washer-feeding unit placed at the lower end of said sloping circular conduit, and a dumping conduit for discharging the assembled screws and washers, said device being characterized in that a second disc, to be integrally rotated together with said first disc having peripheral hollow spaces, is arranged beneath said circular sloping conduit, said second disc carrying evenly spaced apart dowels in the same number as that of the peripheral hollow spaces of the first disc, the axes of said dowels being arranged on a circumference having a radius equal to the radius of the circumference on which the axes of the screw stalks inserted in the hollow spaces of the first disc are arranged, said dowels being capable of being passed through the central longitudinal slit of said sloping circular conduit for the washers.

By virtue of these features of the device according to the invention, one can obtain the positive forcible drive of the washers onto the screw stalks, because the washers are driven into said sloping circular conduit by the action of the dowels integrally secured to said second disc. In addition, the device is independent of the length allowances for the screw stalks, so that it can be used, without requiring any adjustments, for screws having different stalk lengths within a certain range so that a reliable assemblage of the washers onto the stalks is warranted.

Further advantageous features afforded by the present invention and the advantages deriving therefrom will become apparent from the ensuing detailed description of an exemplary embodiment, reference being had to the accompanying drawings, wherein:

FIG. 1a diagrammatically shows a plan view of the device.

FIG. 1b shows a side elevational view of the device with its conduits but without the feeding units.

FIGS. 2 and 3 are plan views of the device which make other features more conspicuous.

FIG. 5 is a cross-sectional view, taken along the line V—V of FIG. 4.

Figure 4:
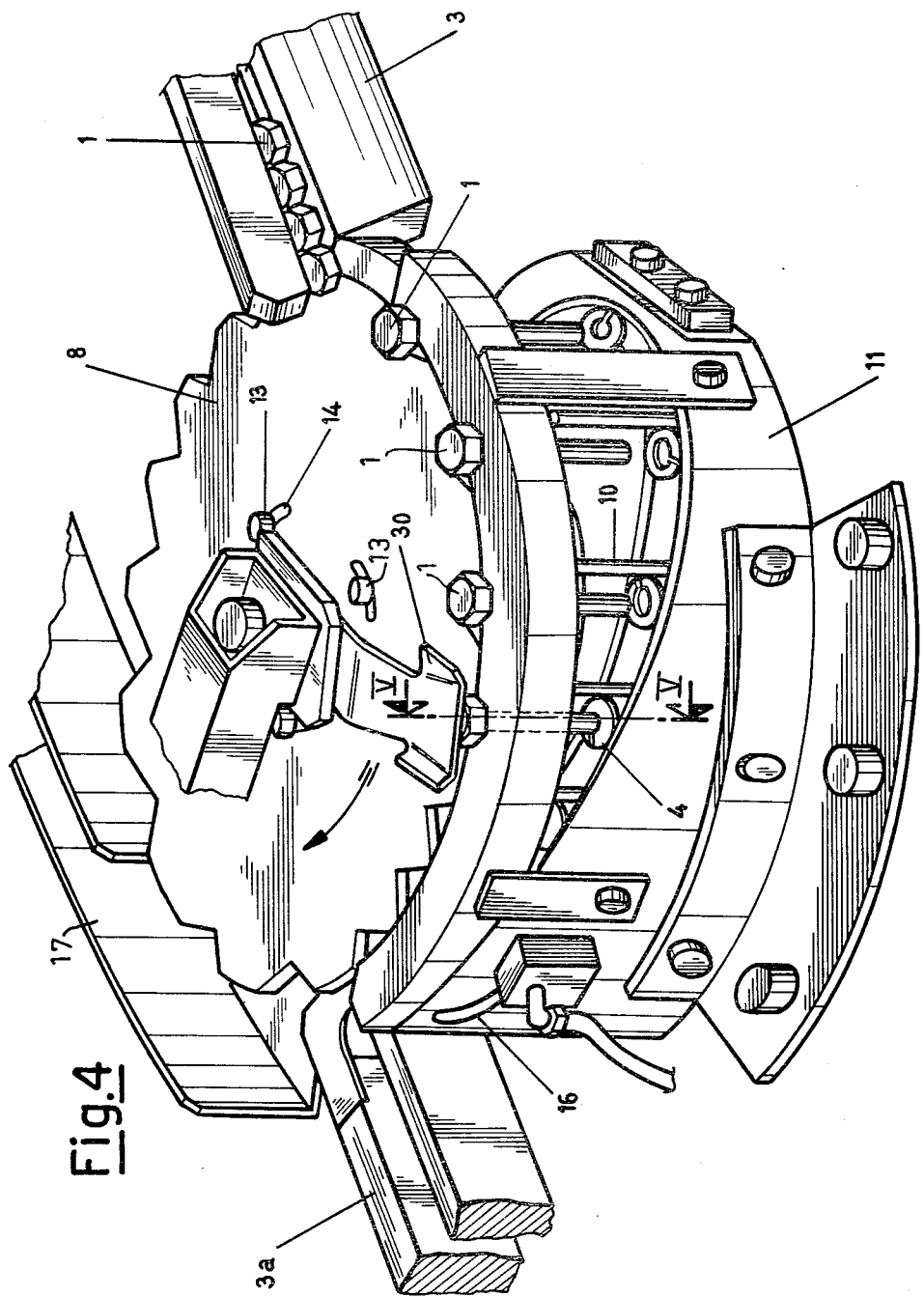
FIG. 4 shows a perspective view of the device and illustrates the feeding conduit, the assembling unit in the instant of time of assembling and the exit conduit for the ready assembled items.

The device, as shown in the drawings, receives the blanks 1 from a conventional feeder 2 through a conduit 3 in which they are moved by gravity pull, whereas it receives the washers 4 directly from another equally conventional, feeder 5 which conveys the washers, one after another, to a terminal in which they are driven.

Figure 6:
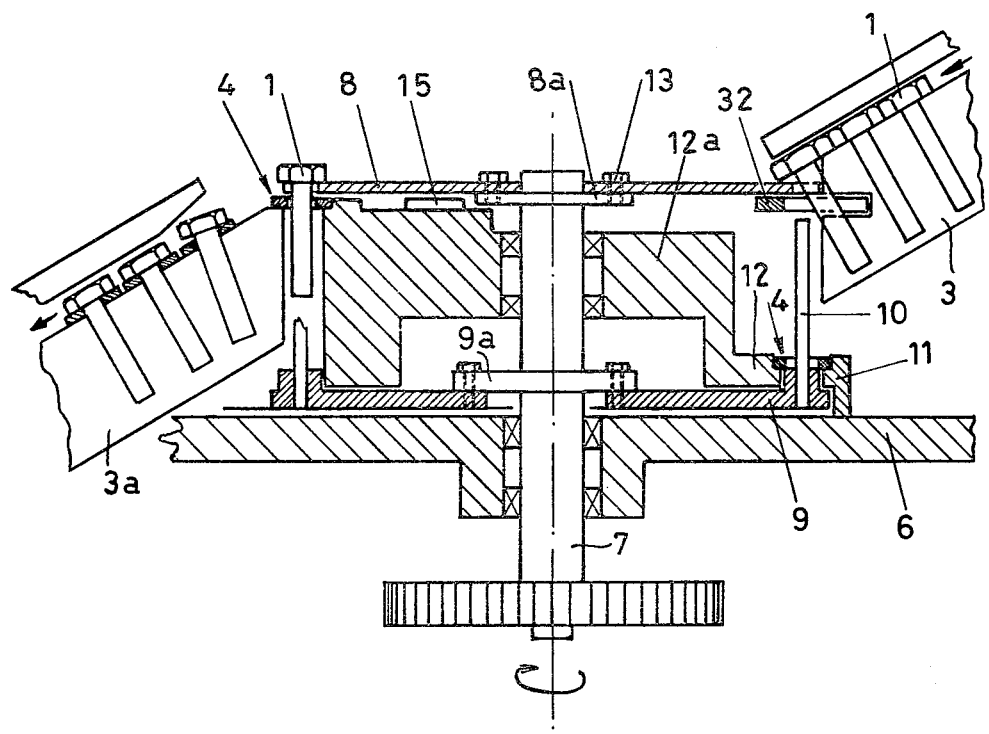
FIG. 6 shows the assembling unit in cross-sectional view taken along the line VI—VI of FIG. 3.

The device (see FIG. 6) is composed of a fixed bed 6 which carries a vertical rotary shaft 7 driven by a driving unit having reducing gears and a clutch (not shown in FIG. 6 of the drawings). The shaft 7 carries at its top, by the agency of a flange 8a a disc 8 having a number, n, of peripheral hollow spaces equally spaced apart and each adapted to receive the stalk of a blank 1. The task of such disc is to support and accompany the blanks during the assembling step.

The shaft 7 carries at its bottom, by the agency of a flange 9a, a disc 9 having evenly spaced apart n vertical dowels 10, the axes of which are arranged on a circumference the radius of which is the same as the radius of the circumference along which the stalks of the blanks 1 inserted in the peripheral hollow spaces of the disc 8 are arranged.

The diameter of the dowels 10 is shorter than, or equal to, the diameter of the blank stalks. The task of such dowels 10 is to push, each, a washer 4 towards the top of a sloping conduit which is circular in plan view, and which supports the washers and guides them laterally.

The conduit for the washers 4 is composed of two sections having a circular outline in plan view, either section, 11, being external to the dowels 10 relative to the axis of the shaft 7 and being secured directly to the bed 6, the other sections, 12, being internal to the dowels 10 and integral with a body 12a mounted on the shaft 7 by two bearings. Such a linkage defines the radial and the vertical positions of the internal portion 12 of the conduit.

The degree of rotary freedom which is thus left with the body 12a is limited by a tongue 15 which is fastened to a supporting member arranged on the bed 6 and the body 12a. The tongue 15 sweeps at its top the disc 8 and at its bottom the ends of the dowels 10.

Between the two sections, the internal section 12 and the external section 11, there is such a gap to permit the passage of a blank stalk 1 therebetween.

The top disc 8 has slots 14 and is secured to the flange 8a of the shaft 7 by bolts 13 in an angularly adjustable way. The angular position of the top disc 8 is set at an appropriate phasing angle relative to the bottom disc 9 carrying the dowels 10 so that the stalks of the blanks 1 are coaxial with the axis of the washers 4 which contact the dowels 10 urging them upwards in the sloping conduit (see FIGS. 4 and 5). The heads of the blanks are pressed downward by a resilient segment 30 which covers the conduit and is positioned in the assembling area.

Thus the rotation of the shaft 7 causes the bottom end of a blank at a time to become gradually nearer to the hole of the relative washer 4 until the washer has been fully inserted onto the stalk, all independently of the length of the blank stalk. For a blank having a longer stalk, the washer will be slipped earlier, whereas for a blank having a shorter stalk the washer will be slipped later: no adjustment is required to suit different stalk lengths.

Moreover, the introduction of the washer onto the stalk is positive (forcible) and reliable since the washers are driven into their conduits by the dowels 10. The device, furthermore, is independent of the length allowances for the blank stalks and the more or less undulated shape of the washer.

A blank coming from the feeding system 2 falls along the sloping conduit 3 by the gravity pull and drops into the peripheral hollow spaces of the top rotary disc 8 which conveys the blank through the assembling unit.

The washers enter one at a time (between a dowel 10 and the next) into their circular conduit of the assembling unit in a position which is immediately upstream, relative to the direction of motion of the rotary disc 8, of the intake of the blanks into the peripheral hollow spaces of the disc 8.

The conduit for the washers 4 is horizontal in the section going from the introduction of the washers to the introduction of the blanks, to become then sloping and raised. As a washer 4 has entered the conduit, the relative dowel 10 urges it upwards all the conduit throughout. If a relative blank 1 was lacking, the washer is blown off by an air jet emerging from a nozzle 16 (see FIGS. 3 and 4) and is returned through a feedback conduit 17 to the starting delivery unit 5. The washers coming from their feeding unit 5, blown by an air jet emerging through a nozzle 20, abut an abutting member, consisting for example, of the crowned head of a pin 18 biassed by a spring 19 (see FIG. 3) and are therefore stopped thereagainst.

A pusher 22 having an end boss is inserted in the hole of the first washer 4 stopped by the head of the biased pin 18 and conveys it to the intake of the circular conduit of the assembling unit.

The introducton of the washers is synchronized with the motion of the dowels 10. For each dowel 10 a washer 4 is introduced.

Once a washer is introduced in the circular conduit, the pusher 22 is brought back to its starting position, by being first lifted and then depressed on the next washer stopped by the head of the biassed pin 18.

Figure 8:
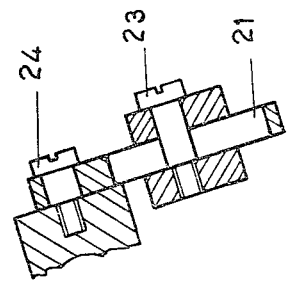
Figure 7:
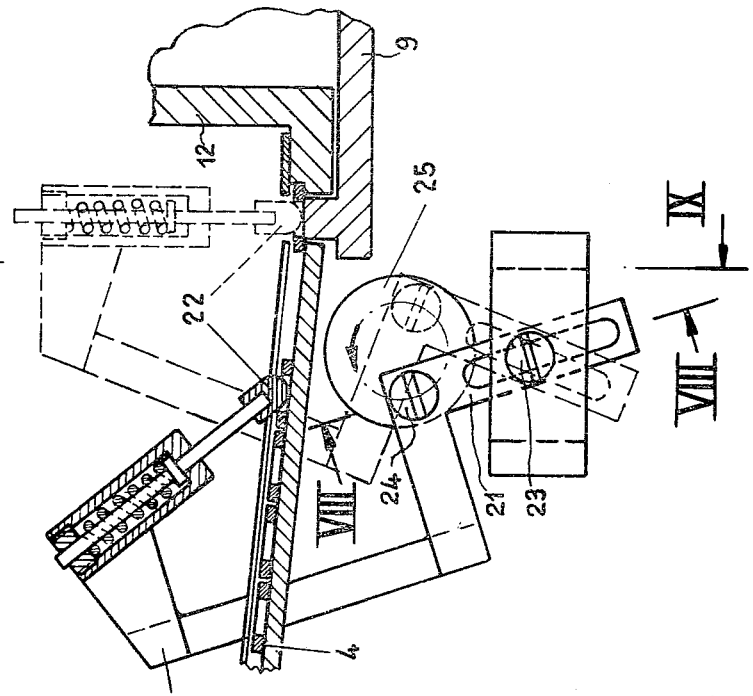
FIG. 7 shows the device for feeding the washers into the assembling unit, in cross-sectional view taken along the line VII—VII of FIG. 6, and FIGS. 8 and 9 are cross-sectional views taken along the line VIII—VIII and IX—IX, of FIG. 7, respectively.

This synchronous introduction can be obtained in a number of ways. In the case shown herein, this is obtained by a crank and slotted link 21 (see FIGS. 7-9) having a spring-biassed end 22.

Figure 9:
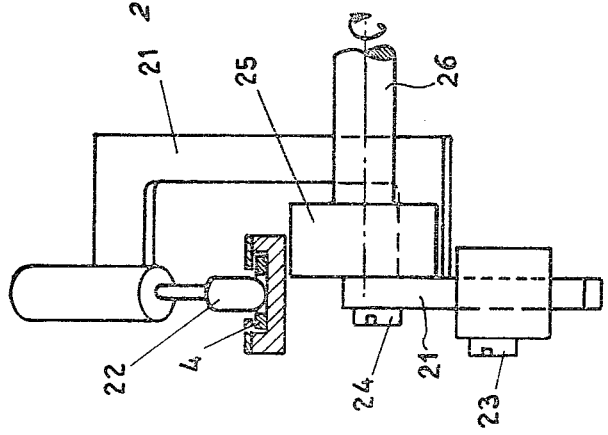

The crank and slotted link 21 slides rectilinearly on a pin 23 and is caused to swing about a pin 24 which is borne eccentrically by a disc 25 integral with a rotary shaft 26 (FIG. 9).

The shaft 26 (see FIG. 2) receives its drive from an angularly mounted idler 27. The rotary shaft 7 of the assembling unit and the angularly mounted idler 27 receive, via toothed sheaves and belts, the drive from a common mover having a reducing gear, 28, and fitted with a clutch, so that the shaft 26 makes a number n of revolutions at every revolution of the assembling disc 8.

Thus, the crank and slotted link will effect a number n of synchronous introduction strokes equal to the number n of the peripheral hollow spaces of the disc 8 which carry the blanks 1. The advantage of such an arrangement is to effect a positive and forcible introduction of the washers 4 into the assembling unit, thus an action which is not entrusted entirely to the action of the gravity pull or a compressed air blow.

To prevent any possibility that at the exit from the assembling unit, blanks 1 not assembled with their attendant washers 4 may appear, the invention provides, with advantage, the following safety system. A photoelectric cell 29 (see FIG. 3) activated by the pin 18 delivers a pulse only for each washer 4 which entered the assembling unit. By a proximity switch 33 a pulse is produced which gives an information as to the phase of the dowels 10 of the assembling unit.

An electronic circuitry (not shown) processing such data, gives an output signal to an electromagnetic valve (not shown in the diagram). Such electromagnetic valve commands a pneumatic ram 31 which, by moving a terminal piece 32 blocks the output of the conduit 3 for the blanks 1 in the assembling unit.

The electronic circuitry, of the digital type, takes into account the angular distance of the conduit of delivery of the washers 4 from the conduit 3 for the blanks, and such distance is measured on the basis of the number of washers contained in the assembling unit between the two conduits.

The circuit prevents the entrance of a blank 1 into a peripheral hollow space of the disc 8 of the assembling unit when a washer is lacking in the circular conduit for the washers 4 in the assembling unit in correspondance with the exit of the blanks. There is thus the certainty that no blanks may exit the assembling unit without having their relevant washers slipped thereon.

The exit channel for the assembled items is indicated at 3a in the drawings.

As can be seen from the foregoing description, the device according to the invention permits that the assemblage of screws and like articles with washers, also of the spring type may be effected quite reliably without any troubles due to the dimensional allowances of the pieces to the assembled and without requiring any adjustments for screws having stalks of different lengths. In addition, the safety system with which the device is advantageously equipped prevents the loss of screws which had not possibly been properly assembled, the relevant washers being recovered inasmuch as they are returned to their delivery unit.

We claim:

1. A device for slipping washers and the like onto the shanks of screws and similar articles, said device comprising a first assembling disc having evenly spaced peripheral recesses adapted to receive, to support and to convey said screws, means for imparting to said assembling disc a continuous rotary motion about its axis, a sloping-duct feeding system to feed by, the effect of the gravity, the screws into the peripheral recesses in said disc, a circular upwardly sloping conduit placed beneath the assembling disc for receiving the washers to be slipped onto the screw shanks and having a central longitudinal slit, a washer-feeding unit placed at a lower end of said sloping circular conduit, and a dumping conduit for discharging the assembled screws and washers, said device being characterized in that a second assembling disc, integrally connected for rotation with said first disc and having peripheral recesses, is arranged beneath said circular sloping conduit, said second disc carrying evenly spaced apart dowels in the same number as that of the peripheral recesses of the first disc, the axes of said dowels being arranged on a circumference having a radius equal to the radius of the circumference on which the axes of the screw shanks inserted in the hollow spaces of the first disc are arranged, said dowels being arranged to pass through the central longitudinal slit of said sloping circular conduit for the washers for pushing the washers upwardly along said circular sloping conduit in alignment with said screw shanks for effecting subsequent progressive sliding assembly of said washers on said screw shanks.

2. A device according to claim 1, characterized in that the lower end of said sloping circular conduit for receiving the washers is positioned, with respect to the direction of rotation of said discs, at a point upstream of a point at which the screws are fed to the peripheral recesses of the first disc.

3. A device according to claim 2, characterized in that the circular sloping conduit for the washers further includes a horizontal section extending from said point at which the washers are fed to said lower end of said circular sloping conduit to the point at which the screws are introduced into the peripheral recesses of the first disc.

4. A device according to claim 1, characterized in that the first and the second discs are keyed to a common central shaft, the fastening of at least one of the two discs permitting an angular adjustment relative to the other disc.

5. A device according to claim 1, characterized in that a pusher is provided which is synchronized with the rotation of the discs to transfer the washers one at a time from said washer feeding unit into the sloping circular conduit between adjacent dowels of said second disc wherein an output end of the washer feeding unit is provided with an abutment which is resiliently yieldable and against which an aligned row of washers abut, said pusher being operable to sequentially and selectively transfer a first washer of said row to said lower end of said circular sloping conduit.

6. A device according to claim 5, characterized in that the pusher has a boss-like end piece which is resiliently yieldable and adapted to enter the hole of said first washer of the row, means being provided to impart to said pusher a motion synchronized with the rotation of the two discs so as to push said first washer into said circular sloping conduit.

7. A device according to claim 5, characterized in that said pusher is equipped with a crank and slotted link driven to pivot about a fixed pin by a disc carrying an eccentric pin on which said washer feeding unit is mounted rotatably.

8. A device according to claim 7, characterized in that said disc is driven in rotation with a fixed ratio relative to a shaft which carries said first and second assembling discs so as to effect for each revolution of said assembling discs a number of revolutions equal to the number of the dowels carried by said second assembling disc.

9. A device according to claim 2, characterized in that at an exit end of the feeding conduit for the screws a terminal abutment is provided, in that first means are provided to detect the transfer of the washers from said washer feeding unit to the circular sloping conduit as well as second means for detecting the number of washers contained in an arcuate section of said conduit extending between exit ends of said washer feeding unit and said screw feeding duct, and in that means are provided, controlled by an electronic circuit as a function of information provided by said first and second detecting means to permit operation of said abutment to release a screw from said feeding duct only in the instance where a washer has been inserted in said circular sloping conduit.

* * * * *